No. 825,913. PATENTED JULY 17, 1906.
E. LAMB.
HUB CAP.
APPLICATION FILED SEPT. 9, 1905.
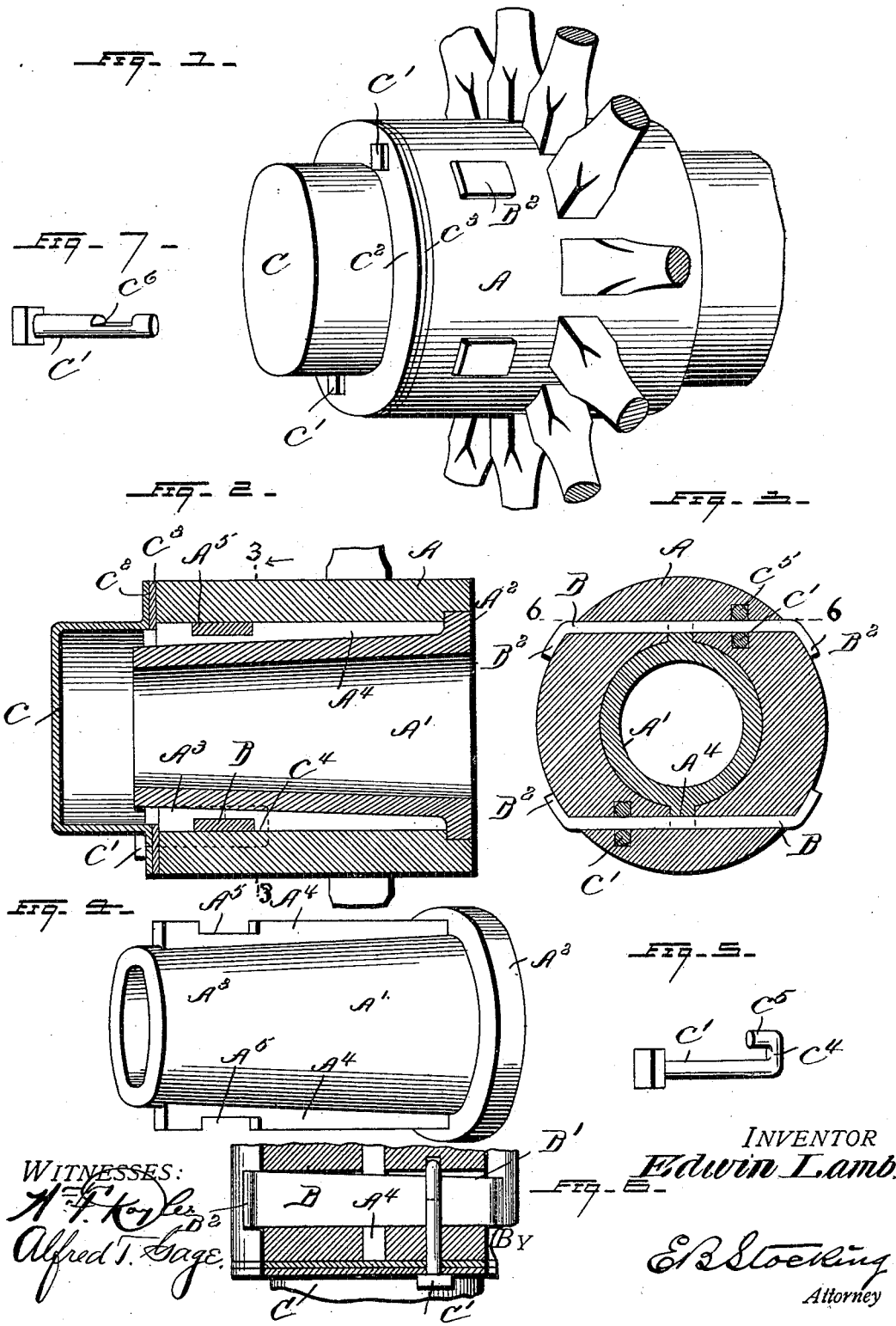
INVENTOR
Edwin Lamb.

UNITED STATES PATENT OFFICE.

EDWIN LAMB, OF YOUNGSTOWN, OHIO.

HUB-CAP.

No. 825,913.　　　Specification of Letters Patent.　　　Patented July 17, 1906.

Application filed September 9, 1905. Serial No. 277,657.

*To all whom it may concern:*

Be it known that I, EDWIN LAMB, a citizen of the United States, residing at Youngstown, in the county of Mahoning, State of Ohio, have invented certain new and useful Improvements in Hub-Caps, of which the following is a specification, reference being had therein to the accompanying drawings.

This invention relates to a hub-cap, and particularly to means for securing the cap and the axle-box in position within the hub of a vehicle.

The invention has for an object to provide for an improved construction and arrangement of key adapted to engage a bolt extended inwardly from the hub-cap and also a member carried by the axle-box, so as to jointly secure these parts in position against movement.

Other and further objects and advantages of the invention will be hereinafter set forth, and the novel features thereof defined in the appended claims.

In the drawings, Figure 1 is a perspective of the invention applied to a hub. Fig. 2 is a central vertical section thereof. Fig. 3 is a vertical section on the line 3 3, Fig. 2. Fig. 4 is a detail perspective of the box removed from the hub. Fig. 5 is a similar view of one form of key-bolt. Fig. 6 is a longitudinal section on the line 6 6, Fig. 3; and Fig. 7 is a perspective of a modified form of key-bolt.

Like letters of reference refer to like parts throughout the several figures of the drawings.

The letter A designates a hub, which may be of any desired construction or configuration and has applied thereto an axle box or sleeve A', provided at one end with a flange $A^2$ to fit the hub and having its outer periphery tapering toward its outer end, as shown at $A^3$, so as to provide a space between the portion $A^3$ of the box and the body of the hub. Upon this outer periphery one or more ribs or splines $A^4$ are provided, and when a plurality are used their outer faces extend parallel to each other. This rib is provided with a recessed portion $A^5$ to provide an abutment adapted to coöperate with a holding-key B, which extends laterally through the hub, as shown in Fig. 3. This key B has one face thereof inclined at an angle to its opposite face, as shown at B', Fig. 6, so as to secure a wedging action in the insertion thereof to draw the box into proper position in the hub, while the key may be retained in position by any desired means—for instance, the downwardly-bent outer ends $B^2$, as shown in Fig. 3.

The axle-box may be secured in position by the parts hereinbefore described; but when it is desired also to retain the hub-cap C thereon by the same means a bolt C' is provided for the purpose and passes through a suitable aperture in the flange $C^2$ of the cap, which flange rests in contact with a suitable packing-ring $C^3$ at the end of the hub. This bolt is formed at its inner end with the contact face or shoulder $C^4$, against which the inclined face of the key B' engages, as shown in Fig. 6, for the purpose of firmly drawing the bolt and cap into position. Various forms of this bolt may be used—for instance, the hooked ends $C^5$, as shown in Fig. 5, or the bolt may be provided with recessed portions $C^6$, as shown in the modified form of the invention in Fig. 7.

In the operation of the invention it will be seen that the boxing is first inserted in the hub and the cap then placed in position with its securing-bolt disposed in the path of the keys B, each when inserted drawing the bolts inward and securely fastening the cap in position, and they also by their engagement with the ribs upon the box prevent any longitudinal movement thereof relative to the hub. The invention thus provides means for securing both the box and cap in position by means of a single part and embodies simplicity and economy of construction, as well as strength and efficiency in the operation of the parts. The keys may be readily removed when it is desired to remove the cap or replace the boxing.

Having now described my invention and set forth its merits, what I claim, and desire to secure by Letters Patent, is—

1. A device of the class described comprising a hub, a box therefor provided with a longitudinal recessed rib, and a laterally-extending tapering key extending through said hub and the recess of said rib and to longitudinally move the box into position.

2. A device of the class described comprising a hub, a box therefor provided with a longitudinal recessed rib, a laterally-extending key extending through said hub and the recess of said rib, a hub-cap, a key-bolt extending through the same, and means carried by the inner portion of said bolt to engage said key.

3. In a device of the class described, a hub, a boxing fitted therein and provided with a plurality of longitudinally-extending ribs having angular recesses upon their faces, and an angular key having a wedge face and disposed laterally to the hub within the recess of the boxing.

4. In a device of the class described, a hub, a cap having a flange to abut the end thereof, a key-bolt passing through said flange and provided with a shoulder at its inner portion, and a key extending laterally to said hub and provided with an inclined face to engage said shoulder.

5. In a device of the class described, a hub, a cap having a flange to abut against one end thereof, a key-bolt passing through said flange and provided with a shoulder at its inner portion, a key extending laterally to said hub and provided with an inclined face to engage said shoulder, a box disposed within said hub and provided with a longitudinal recessed rib to be engaged by said key, and means for retaining said key in position.

In testimony whereof I affix my signature in presence of two witnesses.

EDWIN LAMB.

Witnesses:
R. S. BAKER,
E. D. HASENPLUGH.